Bartholomew & Chapman.
Revolving Harrow.
N° 90,222.    Patented May 18, 1869.

Witnesses:
James P. Grear
J. B. Peyton

Inventors:
Grove S. Bartholomew &
Adelbert R. Chapman
Chipman, Hosmer & Co
attys

United States Patent Office.

GROVE S. BARTHOLOMEW AND ADELBERT R. CHAPMAN, OF READING, MICHIGAN.

Letters Patent No. 90,222, dated May 18, 1869.

IMPROVEMENT IN REVOLVING HARROW.

The Schedule referred to in these Letters Patent and making part of the same.

*To all whom it may concern:*

Be it known that we, GROVE S. BARTHOLOMEW and ADELBERT R. CHAPMAN, of Reading, in the county of Hillsdale, and State of Michigan, have invented a new and valuable Improvement in Revolving Harrows; and we do hereby declare that the following is a full, clear, and exact description of the construction and operation of the same, reference being had to the annexed drawings, making a part of this specification, and to the letters and figures of reference marked thereon.

Figure 1:
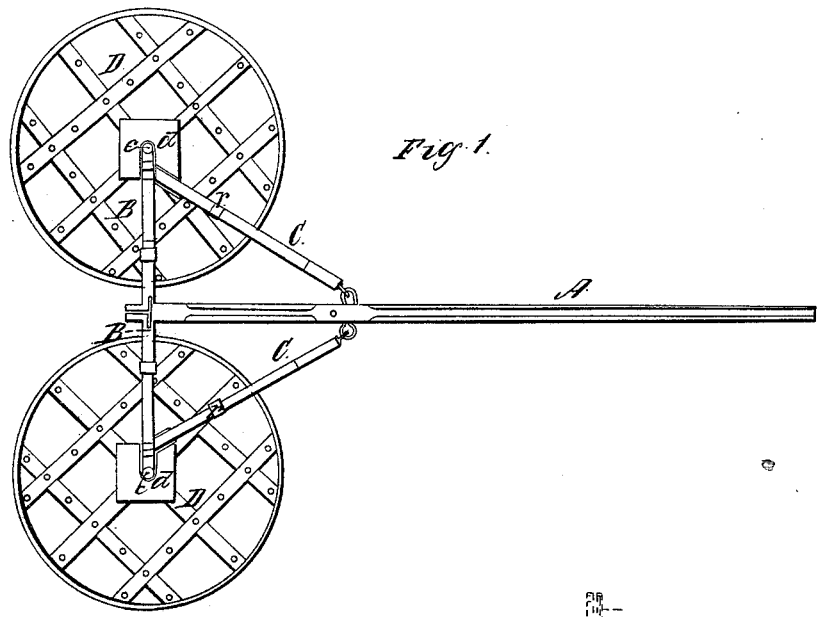

Figure 1 of the drawings is a top plan view of our device.

Figure 2:
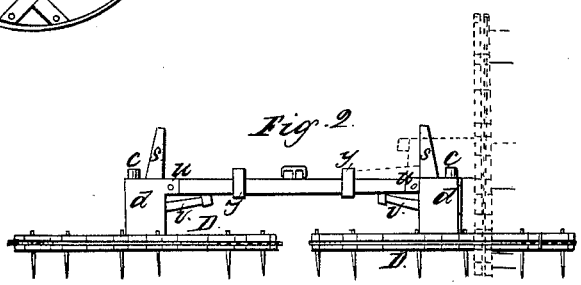

Figure 2 is a transverse sectional view of the same.

Our invention relates to harrows; and

It consists mainly in constructing and arranging a double rotary harrow in such manner that the same may be easily changed to a cart.

The letter A, of the drawings, represents a cart-tongue.

Letter B we call the separator; and

Letters G are draught-bars.

Our harrows are represented by the letters D.

They are connected with the separator respectively by means of the journals $c$, which rotate in bearings $d$, in the manner shown on fig. 2, and the arms $s$ united therewith, as represented on said figure.

The letters $u$ are hinges, by which the arms $s$ are connected with the separator.

The letters $v$ are arms, placed at right angles with the arms $s$, and are hinged to the rear ends of draught-bars C, as shown.

The letters $r$ are adjustable bands, placed around the draught-bars C, which, when the harrows are placed in a vertical position, are adjusted over the arms $v$, and serve to hold the same firmly against said draught-bars.

The letters $y$ are adjustable bands, placed around the separator, and which, when the harrows are placed in a vertical position, are adjusted around the arms $s$, and serve to hold the same securely and firmly upon the top of said separator.

Our device is operated as follows:

When the same is to be used as a harrow, we arrange it as shown on fig. 1.

When the harrowing is done, or when, for any other reason, we desire to change it to a cart, we slide the bands $y$ outward on the separator, and the bands $r$ rearward upon the draught-arms, until the arms $r$ and $s$ are respectively clasped thereby. The harrows are at the same time turned upward until they assume the position shown by the blue wheel on fig. 2.

By these movements, the harrow is converted into a cart, and is ready for transportation in that form.

What we claim as our invention, and desire to secure by Letters Patent, is—

A convertible harrow and cart, having separator B, draught-bars C, journals $c$, arms, hinges, and adjustable bands, as described, when constructed and operating substantially as specified.

In testimony that we claim the above, we have hereunto subscribed our names, in the presence of two witnesses.

GROVE S. BARTHOLOMEW.
ADELBERT R. CHAPMAN.

Witnesses:
HASEY E. BARKER,
WILLIAM W. WHITMORE.